(12) United States Patent
Bai et al.

(10) Patent No.: US 11,601,803 B2
(45) Date of Patent: *Mar. 7, 2023

(54) IMPLEMENTATION AND COMMUNICATION METHODS, APPARATUS AND SYSTEM OF VIRTUAL SUBSCRIBER IDENTITY MODULE

(71) Applicant: Huawei Technologies Co., Ltd., Shenzhen (CN)

(72) Inventors: Zhidong Bai, Shenzhen (CN); Min Lu, Shenzhen (CN); Bingfu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,649

(22) Filed: Dec. 31, 2020

(65) Prior Publication Data

US 2021/0127258 A1 Apr. 29, 2021

Related U.S. Application Data

(60) Continuation of application No. 15/882,706, filed on Jan. 29, 2018, now Pat. No. 10,917,781, which is a
(Continued)

(30) Foreign Application Priority Data

Oct. 11, 2012 (CN) .......................... 201210384600.3

(51) Int. Cl.
*H04W 8/24* (2009.01)
*H04W 8/20* (2009.01)
(Continued)

(52) U.S. Cl.
CPC ....... *H04W 8/245* (2013.01); *H04M 15/8038* (2013.01); *H04M 17/02* (2013.01);
(Continued)

(58) Field of Classification Search
CPC ........... H04M 17/026; H04M 15/8038; H04M 17/103; H04M 17/023; H04M 17/02;
(Continued)

(56) References Cited

U.S. PATENT DOCUMENTS 6,104,928 A 8/2000 Waugh
6,178,506 B1 1/2001 Quick, Jr.
(Continued)

FOREIGN PATENT DOCUMENTS

CN 1331874 A 1/2002
CN 1331874 C 8/2007
(Continued)

*Primary Examiner* — Mehmood B. Khan
(74) *Attorney, Agent, or Firm* — Leydig, Voit & Mayer, Ltd.

(57) ABSTRACT

The present invention provides implementation and communication methods, an apparatus and a system of a virtual subscriber identity module. The implementation method includes: receiving a VSIM application request sent by a terminal, where the VSIM application request carries an identifier of a VSIM desired by the terminal; obtaining corresponding VSIM installation information according to the identifier of the desired VSIM; and sending the VSIM installation information to the terminal, so that the terminal installs the VSIM according to the VSIM installation information. The embodiments of the present invention effectively solve a problem where an existing mobile operator network does not support the VSIM, and provide an effective and convenient operation scheme for an existing domestic or international roaming service.

18 Claims, 11 Drawing Sheets

The VSIM management server receives binding request information sent by the terminal, where the binding request information carries the identifier of the VSIM of the terminal — 401

The VSIM management server performs a binding setting according to the identifier of the SIM of the terminal and the identifier of the VSIM — 402

Related U.S. Application Data division of application No. 14/685,218, filed on Apr. 13, 2015, now Pat. No. 9,913,131, which is a continuation of application No. PCT/CN2013/084598, filed on Sep. 29, 2013.

(51) Int. Cl.

| | |
|---|---|
| *H04M 17/02* | (2006.01) |
| *H04M 17/00* | (2006.01) |
| *H04M 15/00* | (2006.01) |
| *H04W 8/18* | (2009.01) |
| *H04W 8/04* | (2009.01) |

(52) U.S. Cl.
CPC ....... *H04M 17/023* (2013.01); *H04M 17/026* (2013.01); *H04M 17/103* (2013.01); *H04W 8/04* (2013.01); *H04W 8/183* (2013.01); *H04W 8/205* (2013.01)

(58) Field of Classification Search
CPC ..... H04W 8/183; H04W 8/245; H04W 8/205; H04W 8/04
See application file for complete search history.

(56) References Cited

U.S. PATENT DOCUMENTS

| | | | | |
|---|---|---|---|---|
| 6,324,402 | B1 * | 11/2001 | Waugh | H04W 92/02 455/445 |
| 2009/0077643 | A1 | 3/2009 | Schmidt et al. | |
| 2009/0163175 | A1 * | 6/2009 | Shi | H04W 12/42 455/411 |
| 2009/0190468 | A1 | 7/2009 | Gillot et al. | |
| 2010/0210304 | A1 * | 8/2010 | Huslak | H04W 8/183 707/E17.001 |
| 2010/0311391 | A1 * | 12/2010 | Siu | H04W 8/205 455/418 |
| 2010/0311402 | A1 * | 12/2010 | Srinivasan | H04W 8/183 455/418 |
| 2011/0028135 | A1 * | 2/2011 | Srinivasan | H04M 3/42382 455/415 |
| 2012/0244816 | A1 * | 9/2012 | Yi | H04W 4/40 455/67.11 |
| 2013/0310108 | A1 * | 11/2013 | Altman | H04W 8/08 455/552.1 |
| 2013/0329639 | A1 * | 12/2013 | Wietfeldt | H04W 88/06 370/328 |
| 2015/0057044 | A1 * | 2/2015 | Altman | H04W 12/08 455/558 |
| 2015/0215773 | A1 | 7/2015 | Bai et al. | |
| 2015/0230087 | A1 | 8/2015 | Barkan | |
| 2015/0304506 | A1 * | 10/2015 | Zhu | H04W 8/205 455/406 |

FOREIGN PATENT DOCUMENTS

| | | | | |
|---|---|---|---|---|
| CN | 101577713 | A | | 11/2009 |
| CN | 101919220 | A | | 12/2010 |
| CN | 101978675 | A * | 2/2011 | ............ H04L 63/06 |
| CN | 102457833 | A | | 5/2012 |
| CN | 102917339 | A | | 2/2013 |
| EP | 2410777 | A1 | | 1/2012 |
| GB | 2435156 | A | | 8/2007 |
| GB | 2442565 | A * | 4/2008 | ............ H04W 4/003 |
| GB | 2442565 | A | | 4/2008 |
| WO | 2009082759 | A1 | | 7/2009 |
| WO | WO-2011160231 | A2 * | 12/2011 | ............ H04L 63/12 |

\* cited by examiner

IMPLEMENTATION AND COMMUNICATION METHODS, APPARATUS AND SYSTEM OF VIRTUAL SUBSCRIBER IDENTITY MODULE

CROSS-REFERENCE TO RELATED APPLICATIONS

This application is a continuation of U.S. patent application Ser. No. 15/882,706, filed on Jan. 29, 2018, (Now U.S. Pat. No. 10,917,781), which is a divisional application of U.S. patent application Ser. No. 14/685,218, filed on Apr. 13, 2015, (Now U.S. Pat. No. 9,913,131), which is a continuation of International Application No. PCT/CN2013/084598, filed on Sep. 29, 2013, which claims priority to Chinese Patent Application No. 201210384600.3, filed on Oct. 11, 2012. All of the afore-mentioned patent applications are hereby incorporated by reference in their entireties.

TECHNICAL FIELD

The present invention relates to radio communications technologies, and in particular, to implementation and communication methods, an apparatus and a system of a virtual subscriber identity module.

BACKGROUND

With constant development of communications technologies, a new design concept of a subscriber identity module (SIM) has emerged, that is, a virtual subscriber identity module (VSIM) is used to replace an existing entity SIM so as to implement functions of the entity SIM. By using the VSIM, a mobile operator directly provides the VSIM for a terminal, and does not need to use the entity SIM to bind a phone number to the terminal, thereby reducing a cost of generating the entity SIM and a resource waste.

However, an existing mobile operator network does not support the VSIM and the communication of the terminal with the VSIM cannot be implemented, and thus implementation and popularization of the VSIM are seriously restricted.

SUMMARY

The present invention provides implementation and communication methods, an apparatus and a system of a virtual subscriber identity module, so as to solve the foregoing problem and improve compatibility of a mobile communication network.

A first aspect of the present invention provides a method for implementing a virtual subscriber identity module of a terminal, including:

receiving a virtual subscriber identity module VSIM application request sent by the terminal, where the VSIM application request carries an identifier of a VSIM desired by a user of the terminal;

obtaining corresponding VSIM installation information according to the identifier of the desired VSIM; and sending the VSIM installation information to the terminal, so that the terminal installs the VSIM according to the VSIM installation information.

Before the receiving a VSIM application request sent by the terminal, the method for implementing the virtual subscriber identity module of the terminal further includes:

receiving an identifier of a SIM of the terminal that is sent by a mobile switching center; and sending VSIM application address information to the terminal according to the identifier of the SIM of the terminal, so that the terminal sends the VSIM application request according to the address information.

The method for implementing the virtual subscriber identity module of the terminal further includes:

obtaining parameter information of the VSIM; and generating the VSIM installation information according to the parameter information.

The parameter information of the VSIM includes: an international mobile subscriber identity, a phone number and subscriber identity authentication security algorithm information, or additionally, source identification information of the parameter information of the VSIM.

After the sending the VSIM installation information to the terminal according to the identifier of the SIM, so that the terminal installs the VSIM according to the VSIM installation information, the method for implementing the virtual subscriber identity module of the terminal further includes:

receiving first activation information sent by the terminal, where the first activation information carries an activation code and the identifier of the VSIM;

verifying whether the activation code corresponding to the identifier of the VSIM is correct;

if the activation code is correct, sending second activation information carrying the identifier of the VSIM to a network side network element or according to a mapping relationship between the identifier of the VSIM and an identifier of the network side network element, obtaining the identifier of the network side network element corresponding to the identifier of the VSIM, and sending the second activation information carrying the identifier of the VSIM to the network side network element corresponding to the identifier of the network side network element, so that the network side network element returns, according to the identifier of the VSIM, first response information carrying the identifier of the VSIM; and receiving the first response information, and sending second response information to the terminal according to the identifier of the VSIM, so as to activate the VSIM installed by the terminal.

After the sending the VSIM installation information to the terminal, so that the terminal installs the VSIM according to the VSIM installation information, the method for implementing the virtual subscriber identity module of the terminal further includes:

receiving binding request information sent by the terminal, where the binding request information carries the identifier of the VSIM of the terminal; and performing a binding setting according to the identifier of the SIM of the terminal and the identifier of the VSIM.

In the method for implementing the virtual subscriber identity module of the terminal, the performing a binding setting according to the identifier of the SIM and the identifier of the VSIM is specifically:

obtaining an identifier of an HLR of the VSIM according to the identifier of the VSIM; and according to the identifier of the HLR, sending binding information carrying the identifier of the SIM and the identifier of the VSIM to the HLR, so that according to the binding information, the HLR correspondingly stores the identifier of the VSIM and the identifier of the SIM, and establishes an association relationship between the identifier of the VSIM and the identifier of the SIM, thus when the mobile switching center receives a paging message carrying the identifier of the SIM, if a query shows that the VSIM bound to the SIM is stored in the HLR, the mobile switching center sends a paging carrying the identifier of the VSIM.

A second aspect of the present invention provides a virtual subscriber identity module management server, including:

a receiving module, configured to receive a VSIM application request sent by a terminal, where the VSIM application request carries an identifier of a VSIM desired by a user of the terminal;

a first obtaining module, configured to obtain corresponding VSIM installation information according to the identifier of the desired VSIM; and a sending module, configured to send the VSIM installation information to the terminal, so that the terminal installs the VSIM according to the VSIM installation information.

The virtual subscriber identity module management server further includes:

the receiving module, further configured to receive an identifier of a SIM of the terminal that is sent by a mobile switching center; and the sending module, further configured to send VSIM application address information to the terminal according to the identifier of the SIM of the terminal, so that the terminal sends the VSIM application request according to the address information.

The virtual subscriber identity module management server further includes:

a second obtaining module, configured to obtain parameter information of the VSIM; and a generating module, configured to generate the VSIM installation information according to the parameter information.

The virtual subscriber identity module management server further includes:

the receiving module, further configured to receive first activation information sent by the terminal, where the first activation information carries an activation code and the identifier of the VSIM;

a verifying module, configured to verify whether the activation code corresponding to the identifier of the VSIM is correct, and if the activation code is correct, generate a verification pass instruction; and the sending module, further configured to: send second activation information carrying the identifier of the VSIM to a network side network element according to the verification pass instruction, or according to a mapping relationship between the identifier of the VSIM and an identifier of the network side network element, obtain the identifier of the network side network element corresponding to the identifier of the VSIM, and send the second activation information carrying the identifier of the VSIM to the network side network element corresponding to the identifier of the network side network element, so that the network side network element returns, according to the identifier of the VSIM, first answer information carrying the identifier of the VSIM, and after receiving the first response information, sends second response information to the terminal according to the identifier of the VSIM, so as to activate the VSIM installed by the terminal.

The virtual subscriber identity module management server further includes:

the receiving module, further configured to receive binding request information sent by the terminal, where the binding request information carries the identifier of the VSIM of the terminal; and a binding setting module, configured to perform a binding setting according to the identifier of the SIM of the terminal and the identifier of the VSIM.

The binding setting module of the virtual subscriber identity module management server includes:

an obtaining unit, configured to obtain an identifier of an HLR of the VSIM according to the identifier of the VSIM; and a sending unit, configured to: according to the identifier of the HLR, send binding information carrying the identifier of the SIM and the identifier of the VSIM to the HLR, so that according to the binding information, the HLR correspondingly stores the identifier of the VSIM and the identifier of the SIM, and establishes an association relationship between the identifier of the VSIM and the identifier of the SIM, thus when the mobile switching center receives a paging message carrying the identifier of the SIM, if a query shows that the VSIM bound to the SIM is stored in the HLR, the mobile switching center sends a paging carrying the identifier of the VSIM.

A third aspect of the present invention provides a mobile operator network, which includes the virtual subscriber identity module management server and the mobile switching center provided by this embodiment of the present invention.

A fourth aspect of the present invention provides a communication method for a virtual subscriber identity module terminal, including:

receiving a call request sent by the terminal, where the call request carries an identifier of a first VSIM of the terminal and a mobile subscriber number of a called terminal; the identifier of the first VSIM is obtained by the terminal by installing VSIM installation information; and the VSIM installation information is downloaded by the terminal from a VSIM management server;

according to the identifier of the first VSIM and the mobile subscriber number of the called terminal, controlling call establishment between the terminal and the called terminal;

receiving a paging message sent by a calling terminal, where the paging message carries an identifier of a first VSIM of the called terminal; and according to the identifier of the first VSIM, sending a paging carrying the identifier of the first VSIM.

The communication method for the virtual subscriber identity module terminal further includes:

querying whether an identifier of a second VSIM or an identifier of a SIM, associated with the identifier of the first VSIM, is stored in a home location register HLR of the first VSIM, and if so, according to the identifier of the first VSIM, sending a paging carrying the identifier of the first VSIM; and further;

according to the identifier of the second VSIM or the identifier of the SIM, sending a paging carrying the identifier of the second VSIM or the identifier of the SIM.

The communication method for the virtual subscriber identity module terminal further includes:

receiving a location update request sent by the terminal, where the location update request carries the identifier of the first VSIM of the terminal; and according to the location update request, updating location information corresponding to the identifier of the first VSIM in the HLR of the first VSIM.

In the communication method for the virtual subscriber identity module terminal, the according to the location update request, updating location information corresponding to the identifier of the first VSIM in the HLR of the first VSIM includes:

sending an updating location request to the HLR of the first VSIM according to the identifier of the first VSIM carried in the location update request, so that according to the updating location request, the HLR of the first VSIM returns a subscriber data insertion message carrying subscriber data of the first VSIM; and receiving the subscriber data insertion message returned by the HLR of the first VSIM, storing the subscriber data of the first VSIM in a VLR, and sending a subscriber data confirmation message carrying an identifier of the VLR to the HLR of the first VSIM, so that according to the identifier of the VLR, the HLR of the first VSIM updates the location information corresponding to the identifier of the first VSIM, and returns a location update acceptance message.

The communication method for the virtual subscriber identity module terminal further includes:

if the identifier of the second VSIM or the identifier of the SIM, associated with the identifier of the first VSIM, is obtained, updating location information corresponding to the identifier of the second VSIM or the identifier of the SIM in the HLR of the second VSIM or the SIM, according to the identifier of the second VSIM or the identifier of the SIM.

A fifth aspect of the present invention provides a mobile switching center, including:

a first receiving module, configured to receive a call request sent by a terminal, where the call request carries an identifier of a first VSIM of the terminal and a mobile subscriber number of a called terminal, the identifier of the first VSIM is obtained by the terminal by installing VSIM installation information, and the VSIM installation information is downloaded by the terminal from a VSIM management server;

a processing module, configured to: according to the identifier of the first VSIM and the mobile subscriber number of the called terminal, control call establishment between the terminal and the called terminal;

a second receiving module, configured to receive a paging message sent by a calling terminal, where the paging message carries an identifier of a first VSIM of the called terminal; and a sending module, configured to: according to the identifier of the first VSIM, send a paging carrying the identifier of the first VSIM.

The mobile switching center further includes:

a querying module, configured to query whether an identifier of a second VSIM or an identifier of a SIM, associated with the identifier of the first VSIM, is stored in an HLR of the VSIM, and if so, generate a query instruction; and the sending module, further configured to: according to the identifier of the second VSIM or the identifier of the SIM carried in the query instruction, send a paging carrying the identifier of the second VSIM or the identifier of the SIM.

The mobile switching center further includes:

a third receiving module, configured to receive a location update request sent by the terminal, where the location update request carries the identifier of the first virtual subscriber identity module VSIM of the terminal; and a location updating module, configured to: according to the location update request, update the location information corresponding to the identifier of the first VSIM in the HLR of the first VSIM.

The location updating module of the mobile switching center includes:

a first sending unit, configured to: according to the identifier of the first VSIM carried in the location update request, send the updating location request to the HLR of the first VSIM, so that according to the updating location request, the HLR of the first VSIM returns a first subscriber data insertion message carrying subscriber data of the first VSIM;

a receiving unit, configured to receive the subscriber data insertion message returned by the HLR of the first VSIM;

a storing unit, configured to store in a VLR the subscriber data of the first VSIM carried in the subscriber data insertion message received by the receiving unit, and generate a storage completion instruction; and a second sending unit, configured to: after receiving the storage completion instruction, send a subscriber data confirmation message carrying an identifier of the VLR to the HLR of the first VSIM, so that according to the identifier of the VLR, the HLR of the first VSIM updates the location information corresponding to the identifier of the first VSIM, and returns a location update acceptance message.

The mobile switching center further includes:

the location updating module, further configured to: when the identifier of the second VSIM or the identifier of the SIM, associated with the identifier of the first VSIM, is obtained, update location information corresponding to the identifier of the second VSIM or the identifier of the SIM in an HLR of the second VSIM or the SIM, according to the identifier of the second VSIM or the identifier of the SIM.

A sixth aspect of the present invention provides a mobile operator network, which includes the mobile switching center, VLR and HLR provided by this embodiment of the present invention.

The foregoing technical solutions indicate that: In the embodiments of the present invention, providing VSIM installation information to a terminal enables the terminal to download and install the VSIM installation information, a problem where an existing mobile operator network does not support a VSIM is effectively solved, a way to provide a SIM is added, and a user can directly obtain the SIM by means of an application and does not need to purchase an entity SIM, thereby providing convenience for the user, and lowering manufacturing costs of the SIM. In addition, by using the technical solutions provided by the embodiments of the present invention, communication between the terminal and another terminal can be implemented by using the VSIM, and compatibility of the mobile operator network is further improved, so that the mobile operator network can support both an existing entity SIM and the VSIM at the same time. The embodiments of the present invention provide an effective and convenient operation scheme for an existing domestic or international roaming service.

DETAILED DESCRIPTION

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
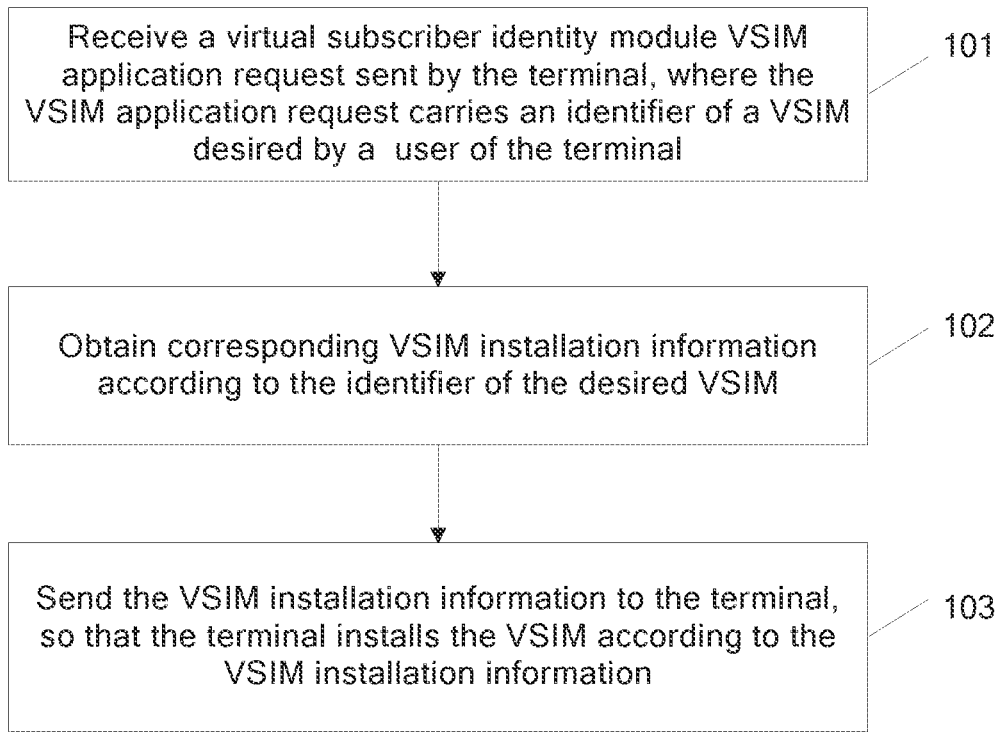
FIG. 1 is a schematic flowchart of Embodiment 1 of a method for implementing a VSIM of a terminal provided by the present invention.

FIG. 1 is a schematic flowchart of Embodiment 1 of a method for implementing a VSIM of a terminal provided by the present invention. As shown in the figure, the method for implementing the VSIM of the terminal described in Embodiment 1 includes:

Step 101: Receive a VSIM application request sent by the terminal, where the VSIM application request carries an identifier of a VSIM desired by a user of the terminal.

A VSIM management server receives the VSIM application request sent by the terminal, where the VSIM management server can be newly added in a mobile operator network by an existing mobile operator, or set by a third-party operator. The third-party operator is another operator providing only the VSIM except the existing mobile operator. The VSIM management server can be an entity server, or a virtual server implemented based on an existing cloud computing technology. The virtual server implemented based on the cloud computing technology is a cloud computing platform established based on resources of all mobile operators. Based on the cloud computing platform, the third-party operator provides only installation information of the VSIM, and thus can provide a uniform service interface for all terminal subscribers to download the installation information of the VSIM.

Step 102: Obtain corresponding VSIM installation information according to the identifier of the desired VSIM.

At least one piece of VSIM installation information and an identifier of a corresponding VSIM are stored in the VSIM management server. The VSIM management server obtains the corresponding VSIM installation information according to the identifier of the desired VSIM.

Step 103: Send the VSIM installation information to the terminal, so that the terminal installs the VSIM according to the VSIM installation information.

The VSIM installation information carries a VSIM installation program. After obtaining the VSIM installation information, the VSIM management server sends the VSIM installation information to the terminal, so that the terminal installs the VSIM according to the VSIM installation information.

In this embodiment, providing the VSIM installation information to the terminal enables the terminal to download and install the VSIM installation information, a problem where an existing mobile operator network does not support the VSIM is effectively solved, the way to supply a SIM is increased, a user can directly obtain the SIM by means of an application and does not need to purchase an entity SIM, thereby providing convenience for the user, and lowering manufacturing costs of the SIM, and compatibility of the mobile communication network is effectively improved, thus the mobile operator network can support both an existing entity SIM and the VSIM at the same time. The embodiments of the present invention provide an effective and convenient operation scheme for an existing domestic or international roaming service.

Figure 2:
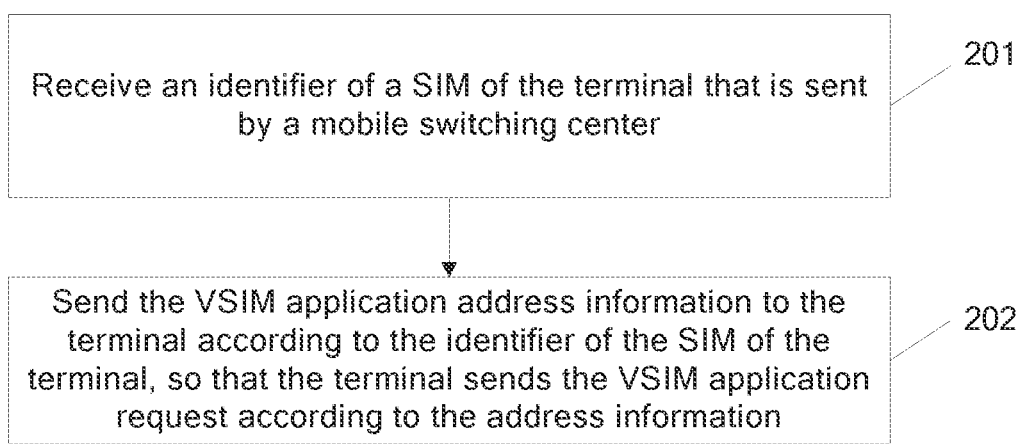
FIG. 2 is a schematic flowchart of Embodiment 2 of a method for implementing a VSIM of a terminal provided by the present invention.

Further, as shown in FIG. 2, before the step 101, the method for implementing the VSIM of the terminal described in Embodiment 1 further includes:

Step 201: Receive an identifier of a SIM of the terminal that is sent by a mobile switching center.

When the terminal roams from a location area corresponding to a location area identity (LAI) stored in the SIM thereof to another location area, the terminal sends a location update request to the mobile switching center in the existing location area where the terminal roams, where the location update request carries the identifier of the SIM of the terminal. At this time, the mobile switching center sends the identifier of the SIM of the terminal to the VSIM management server according to the identifier of the SIM of the terminal, so that the VSIM management server provides a VSIM application alert service for the terminal. Certainly, the terminal directly sends obtaining request information to the mobile switching center from the local so as to obtain VSIM application address information, where the obtaining request information carries the identifier of the SIM of the terminal.

Step 202: Send the VSIM application address information to the terminal according to the identifier of the SIM of the terminal, so that the terminal sends the VSIM application request according to the address information.

Then after receiving the identifier of the SIM of the terminal sent by the mobile switching center, the VSIM management server sends the VSIM application address information to the terminal according to the identifier of the SIM of the terminal. The VSIM application address information can specifically be uniform resource locator information (URL).

Here, it should be noted that: in addition to the foregoing means of obtaining the VSIM application address information, the terminal can also directly receive the VSIM application address information sent by a core network. Specifically, the terminal receives the VSIM application address information sent by the mobile switching center. The mobile switching center can send the VSIM application address information after receiving the obtaining request information sent by the terminal. If the terminal is currently located in a roaming place, when the terminal is connected to a mobile network in the roaming place, by determining the LAI carried in the identifier of the connected SIM of the terminal, the mobile switching center determines that the terminal is connected in a roaming manner, and the mobile switching center sends the VSIM application address information pre-stored in the mobile switching center to the terminal. Certainly, the VSIM application address information can also be directly provided on a web page of a VSIM operator, so that a user can log in to the web page of the operator by using the terminal so as to directly obtain the VSIM application address information and click to download the installation information of the VSIM.

Still further, the method for implementing the VSIM of the terminal described in Embodiment 1 further includes: obtaining parameter information of the VSIM and generating, according to the parameter information, the VSIM installation information, where the parameter information of the VSIM includes: an international mobile subscriber identity, a phone number and subscriber identity authentication security algorithm information, or additionally, source identification information of the parameter information of the VSIM. Specifically, the VSIM management server of the existing mobile operator or third-party operator generates the VSIM installation information according to the parameter information of the VSIM, such as the international mobile subscriber identity (IMSI), phone number and subscriber identity authentication security algorithm and the like. Alternatively, the third-party operator can also be an operator generating the VSIM installation information only according to the parameter information of the VSIM provided by each mobile operator. Specifically, the VSIM management server provided by the third operator receives the parameter information of the VSIM, which is sent by a mobile operator network side network element, and generates, according to the obtained parameter information of the VSIM, the VSIM installation information for a user to download.

Figure 3:
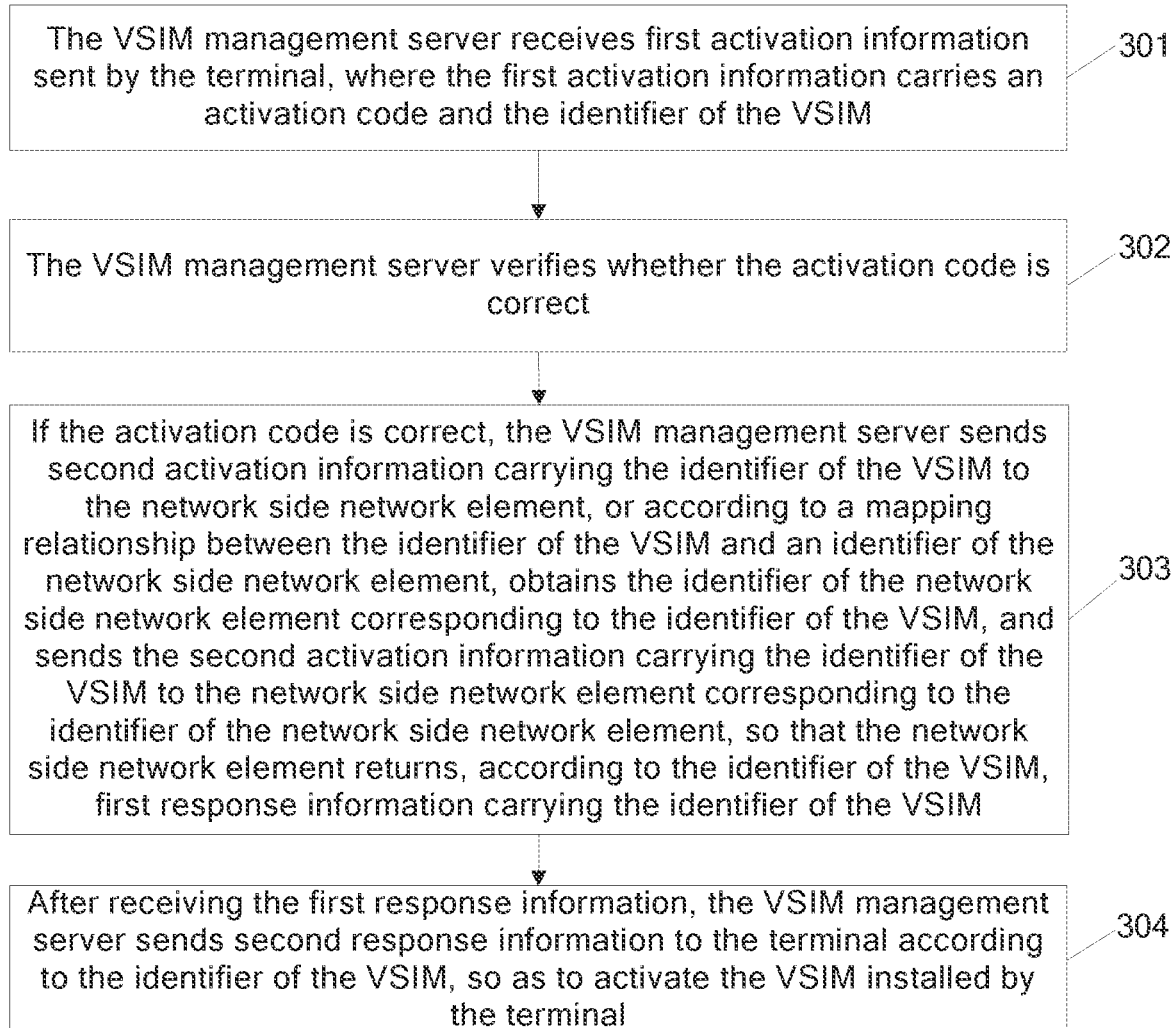
FIG. 3 is a schematic flowchart of Embodiment 3 of a method for implementing a VSIM of a terminal provided by the present invention.

Still further, as shown in FIG. 3, after the step 103, the method for implementing the VSIM of the terminal described in Embodiment 1 further includes:

Step 301: The VSIM management server receives first activation information sent by the terminal, where the first activation information carries an activation code and the identifier of the VSIM.

When the terminal finishes installation of the VSIM according to the VSIM installation information, an activation operation is also required before the VSIM is put into use. Then the terminal sends the first activation information to the VSIM management server, where the first activation information carries the activation code and an identifier of a VSIM to be activated and the activation code can be obtained by the user of the terminal when the VSIM installation information is installed or from the VSIM management server, or the like.

Step 302: The VSIM management server verifies whether the activation code is correct.

According to a preset association relationship between the identifier of the VSIM and the activation code, the VSIM management server verifies whether the activation code carried in the received activation information is the same as the activation code corresponding to the identifier of the VSIM in the preset association relationship between the identifier of the VSIM and the activation code. If so, the activation code is correct; if no, the activation code is wrong.

Step 303: If the activation code is correct, the VSIM management server sends second activation information carrying the identifier of the VSIM to the network side network element, or according to a mapping relationship between the identifier of the VSIM and an identifier of the network side network element, obtains the identifier of the network side network element corresponding to the identifier of the VSIM, and sends the second activation information carrying the identifier of the VSIM to the network side network element corresponding to the network side network element corresponding to the identifier of the network side network element, so that the network side network element returns, according to the identifier of the VSIM, first response information carrying the identifier of the VSIM.

When the VSIM is provided by a mobile operator, that is, the VSIM management server belongs to the mobile operator, the network side network element is specifically a core network in a network system of the mobile operator. If the VSIM is provided by a third-party operator, that is, the third-party operator is not an existing mobile operator and provides only a VSIM installation program, the network side network element is specifically a core network in a network system of a mobile operator designated by the third-party operator; at this time, the VSIM management server, according to a preset mapping relationship between the identifier of the VSIM and the identifier of the network side network element, needs to obtain the identifier of the network side network element corresponding to the identifier of the VSIM, and send the identifier of the VSIM to the network side network element according to the network side network element corresponding to the identifier of the network side network element.

Step 304: After receiving the first response information, the VSIM management server sends second response information to the terminal according to the identifier of the VSIM, so as to activate the VSIM installed by the terminal.

After the terminal implements activation on the installed VSIM by using the foregoing steps, the user can set an existing SIM or another VSIM on the terminal, so that the existing SIM or another VSIM on the terminal can only be used as a called SIM or VSIM to receive voice or data information, rather than a calling SIM or VSIM to send voice or data information out. In this way, the terminal can implement a virtual soft dual standby function. A specific implementation principle is shown in an embodiment described in a subsequent part of the text.

Figure 4:
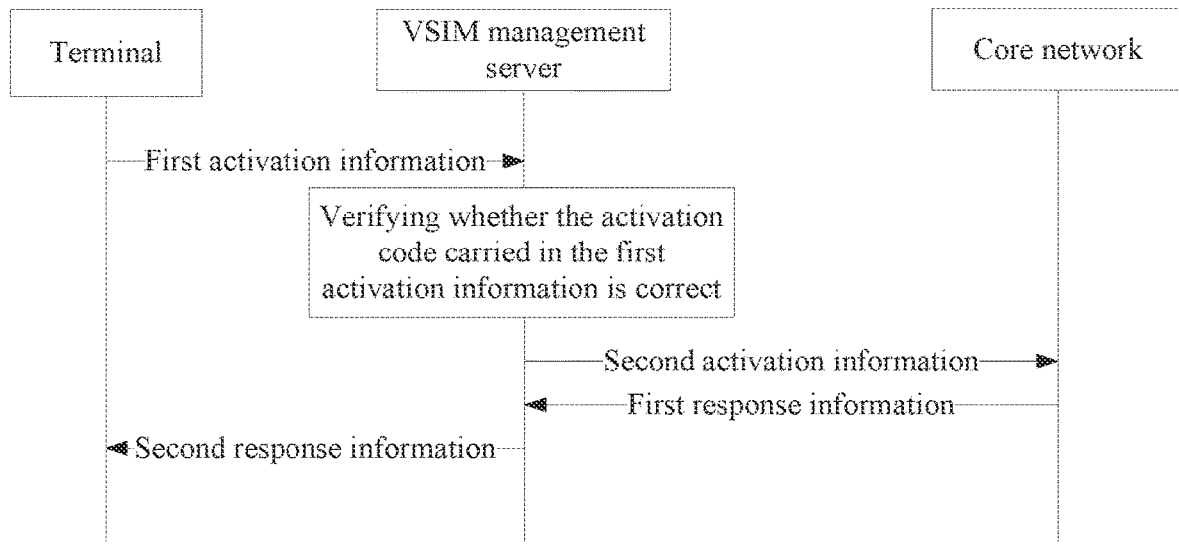
FIG. 4 is a transmission signaling diagram of a specific example that a terminal activates a VSIM by using a method provided by Embodiment 3 of the present invention.

The process of activating the VSIM by the terminal when the VSIM management server is provided by a mobile operator, as shown in the signaling diagram in FIG. 4, includes:

A: The terminal sends first activation information to the VSIM management server, where the first activation information carries the identifier of the VSIM of the terminal and an activation code, and the identifier of the VSIM can specifically be an IMSI of the VSIM.

B: The VSIM management server receives the first activation information, verifies whether the activation code carried in the activation information is correct, and if so, sends to the core network second activation information carrying an identifier of a VSIM to be activated, where the identifier of the VSIM to be activated is the identifier of the VSIM carried in the first activation information.

C: According to the identifier of the VSIM, the core network returns first response information carrying the identifier of the VSIM to the VSIM management server.

D: According to the identifier of the VSIM, the VSIM management server returns second response information to the terminal with the identifier of the VSIM, so as to activate the identifier of the VSIM installed by the terminal.

Figure 5:
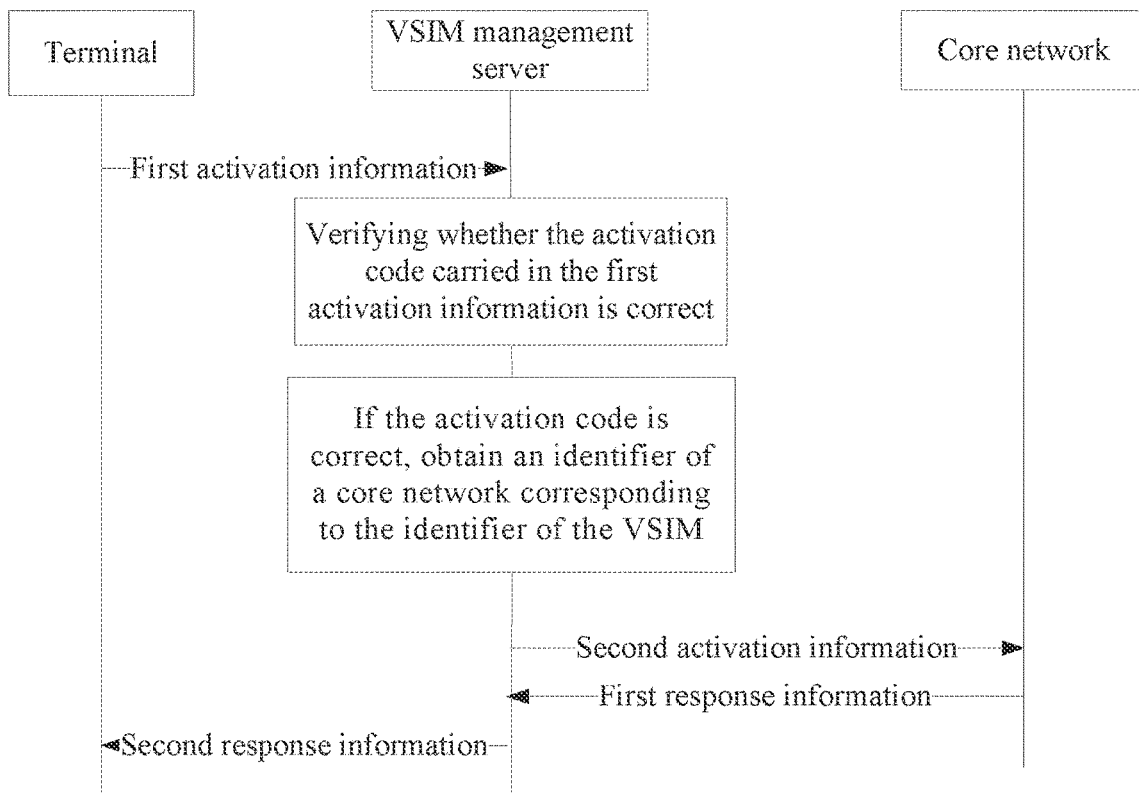
FIG. 5 is a transmission signaling diagram of another specific example that a terminal activates a VSIM by using a method provided by Embodiment 3 of the present invention.

The process of activating the VSIM by the terminal when the VSIM management server is provided by a third-party operator, that is, the third-party operator is not an existing mobile operator and provides only a VSIM installation program, and the parameter information of the VSIM for generating the VSIM installation program is provided by each mobile operator, as shown in the signaling diagram in FIG. 5, includes:

A': The terminal sends first activation information to the VSIM management server, where the first activation information carries the identifier of the VSIM of the terminal and an activation code, and the identifier of the VSIM can specifically be an IMSI of the VSIM.

B': The VSIM management server receives the first activation information, verifies whether the activation code carried in the activation information is correct, and if so, obtains an identifier of a core network corresponding to the identifier of the VSIM, according to a preset mapping relationship between the identifier of the core network and the identifier of the VSIM, and then sends to the core network second activation information carrying an identifier of a VSIM to be activated, according to the identifier of the core network, where the identifier of the VSIM to be activated is the identifier of the VSIM carried in the first activation information.

C': The core network returns first response information carrying the identifier of the VSIM to the VSIM management server according to the identifier of the VSIM.

D': According to the identifier of the VSIM, the VSIM management server returns second response information to the terminal with the identifier of the VSIM, so as to activate the identifier of the VSIM installed by the terminal.

Figure 6:
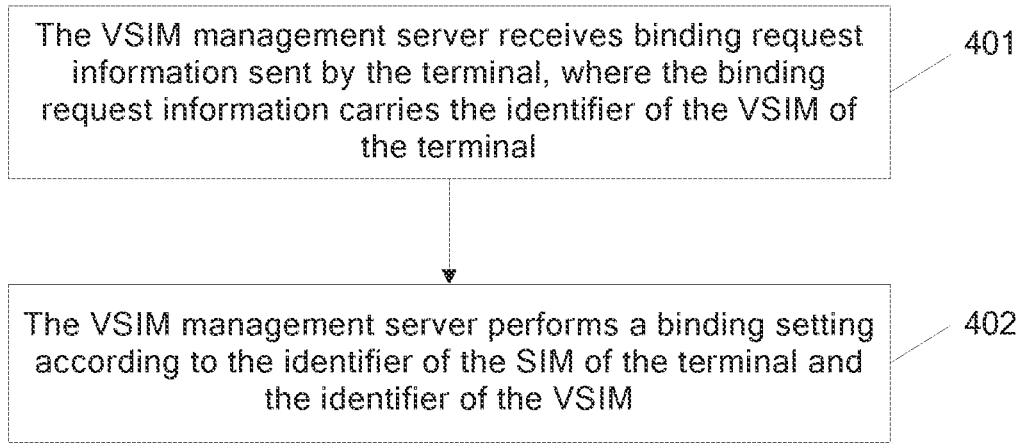
FIG. 6 is a schematic flowchart of Embodiment 4 of a method for implementing a VSIM of a terminal provided by the present invention.

Still further, as shown in FIG. 6, after the step 103 or the step 304, the method for implementing the VSIM of the terminal described in the foregoing embodiments further includes:

Step 401: The VSIM management server receives binding request information sent by the terminal, where the binding request information carries the identifier of the VSIM of the terminal.

Step 402: The VSIM management server performs a binding setting according to the identifier of the SIM of the terminal and the identifier of the VSIM.

At first, the VSIM management server obtains an identifier of an HLR of the VSIM according to the identifier of the VSIM; and afterwards, according to the identifier of the HLR, the VSIM management server sends binding information carrying the identifier of the SIM and the identifier of the VSIM to the HLR, so that according to the binding information, the HLR correspondingly stores the identifier of the VSIM and the identifier of the SIM, and establishes an association relationship between the identifier of the VSIM and the identifier of the SIM, thus when the mobile switching center receives a paging message carrying the identifier of the SIM, if a query shows that the VSIM bound to the SIM is stored in the HLR, the mobile switching center sends a paging carrying the identifier of the VSIM.

Figure 7:
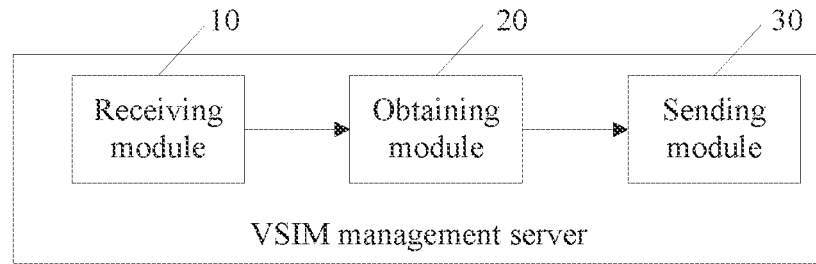
FIG. 7 is a schematic structural diagram of Embodiment 1 of a VSIM management server provided by the present invention.

FIG. 7 is a schematic structural diagram of Embodiment 1 of a VSIM management server provided by the present invention. As shown in the figure, the VSIM management server includes a receiving module 10, a first obtaining module 20 and a sending module 30, where the receiving module 10 is configured to receive a VSIM application request that is sent by a terminal and carrying an identifier of a VSIM desired by a user of the terminal, the first obtaining module 20 is configured to obtain corresponding VSIM installation information according to the identifier of the desired VSIM; and the sending module 30 is configured to send the VSIM installation information to the terminal, so that the terminal installs the VSIM according to the VSIM installation information.

In this embodiment of the present invention, the VSIM management server provides the VSIM installation information for the terminal, so that the terminal can download and install the VSIM installation information, a problem where an existing mobile operator network does not support the VSIM is effectively solved, the way to supply a SIM is increased, a user can directly obtain the SIM by means of an application and does not need to purchase an entity SIM, thereby providing convenience for the user, and lowering manufacturing costs of the SIM, and compatibility of the mobile communication network is effectively improved, thus the mobile operator network can support both an existing entity SIM and the VSIM at the same time. The embodiments of the present invention provide an effective and convenient operation scheme for an existing domestic or international roaming service.

Further, the receiving module described in Embodiment 1 is further configured to receive an identifier of a SIM of the terminal that is sent by a mobile switching center; and the sending module is further configured to send VSIM application address information to the terminal according to the identifier of the SIM of the terminal, so that the terminal sends the VSIM application request according to the address information.

Still further, the VSIM management server described in Embodiment 1 further includes: a second obtaining module and a generating module, where the second obtaining module is configured to obtain parameter information of the VSIM, and the generating module is configured to generate the VSIM installation information according to the parameter information.

Figure 8:
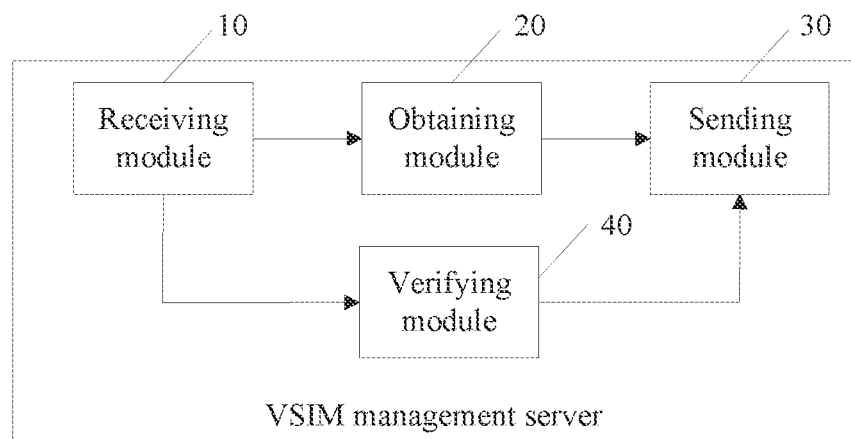
FIG. 8 is a schematic structural diagram of Embodiment 2 of a VSIM management server provided by the present invention.

Still further, the VSIM management server described in the foregoing embodiments, as shown in FIG. 8, further includes a verifying module 40. Correspondingly, the receiving module 10 described in the foregoing embodiments is further configured to receive first activation information sent by the terminal, where the first activation information carries an activation code and the identifier of the VSIM. The verifying module 40 is configured to verify whether the activation code is correct, and if so, generate a verification pass instruction. The sending module 30 is further configured to: send second activation information carrying the identifier of the VSIM to a network side network element according to the verification pass instruction, or according to a mapping relationship between the identifier of the VSIM and an identifier of the network side network element, obtain the identifier of the network side network element corresponding to the identifier of the VSIM, and send the second activation information carrying the identifier of the VSIM to the network side network element corresponding to the identifier of the network side network element, so that the network side network element returns, according to the identifier of the VSIM, first response information carrying the identifier of the VSIM, and after receiving the first response information, sends second answer information to the terminal according to the identifier of the VSIM, so as to activate the VSIM installed by the terminal.

Figure 9:
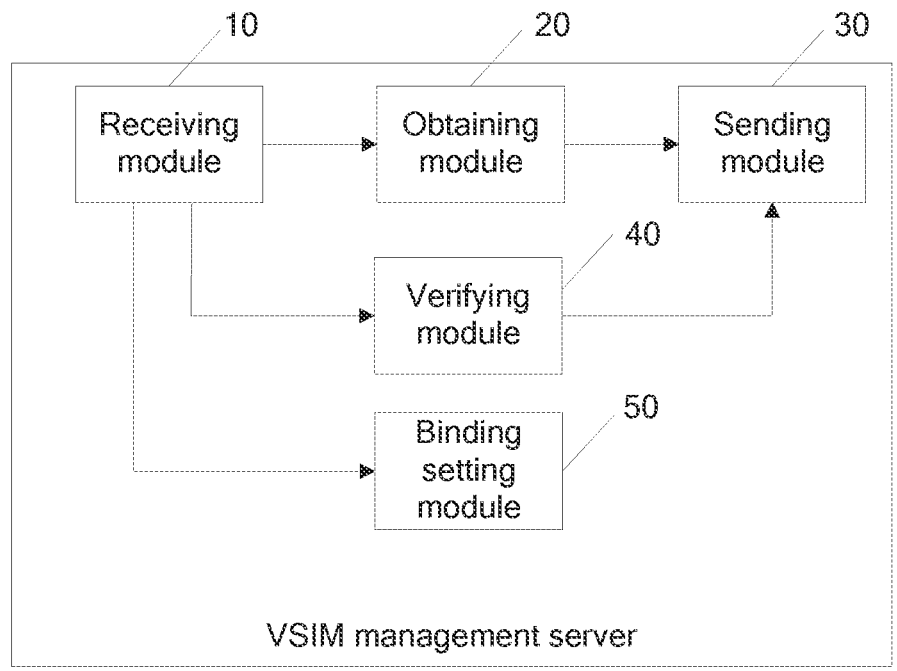
FIG. 9 is a schematic structural diagram of Embodiment 3 of a VSIM management server provided by the present invention.

Still further, the VSIM management server described in the foregoing embodiments, as shown in FIG. 9, further includes a binding setting module 50. Correspondingly, the receiving module 10 described in the foregoing embodiments is further configured to receive binding request information sent by the terminal, where the binding request information carries the identifier of the VSIM of the terminal. The binding setting module 50 is configured to perform a binding setting according to the identifier of the SIM of the terminal and the identifier of the VSIM. The binding setting module can be implemented by using a structure as follows, and specifically, includes an obtaining unit and a sending unit. The obtaining unit is configured to obtain an identifier of an HLR of the VSIM according to the identifier of the VSIM. The sending unit is configured to: according to the identifier of the HLR, send binding information carrying the identifier of the SIM and the identifier of the VSIM to the HLR, so that according to the binding information, the HLR correspondingly stores the identifier of the VSIM and the identifier of the SIM, and establishes an association relationship between the identifier of the VSIM and the identifier of the SIM, thus when the mobile switching center receives a paging message carrying the identifier of the SIM, if a query shows that the VSIM bound to the SIM is stored in the HLR, the mobile switching center sends a paging carrying the identifier of the VSIM.

The present invention provides an embodiment of a mobile operator network. The mobile operator network described in this embodiment includes a VSIM management server and a mobile switching center. The VSIM management server is configured to: receive a VSIM application request sent by a terminal, where the VSIM application request carries an identifier of a VSIM desired by the terminal; obtain corresponding VSIM installation information according to the identifier of the desired VSIM; and send the VSIM installation information to the terminal, so that the terminal installs the VSIM according to the VSIM installation information. Specifically, the VSIM management server can be a VSIM management server described in the foregoing embodiments; an operating principle of the VSIM management operator is shown in the foregoing embodiments and is not described here any further.

Figure 10:
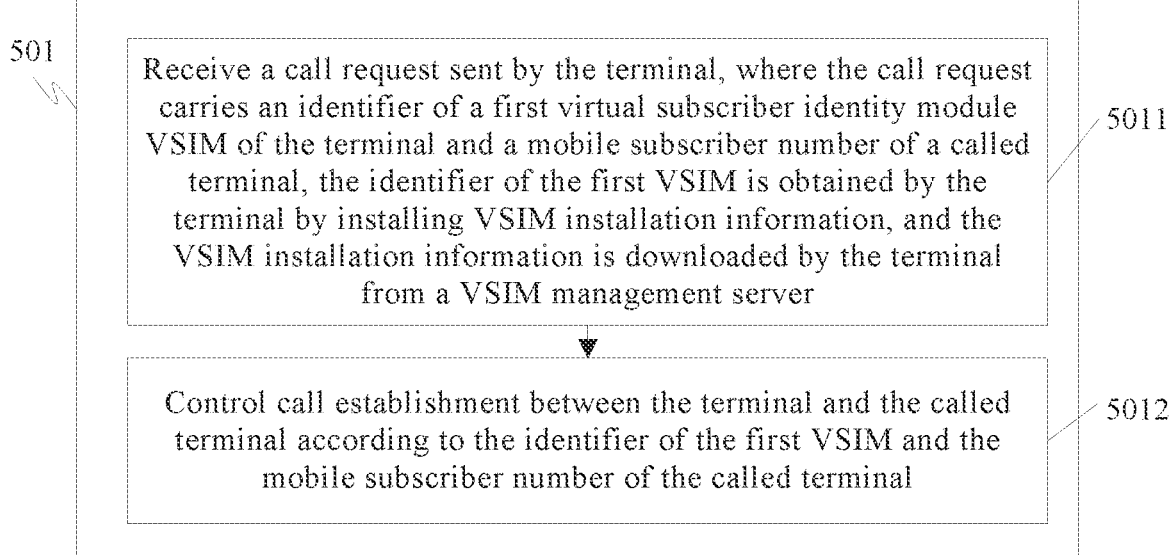
FIG. 10 is a schematic flowchart and schematic structural diagram of a calling paging step in Embodiment 1 of a communication method for a virtual subscriber identity module terminal provided by the present invention.
Figure 11:
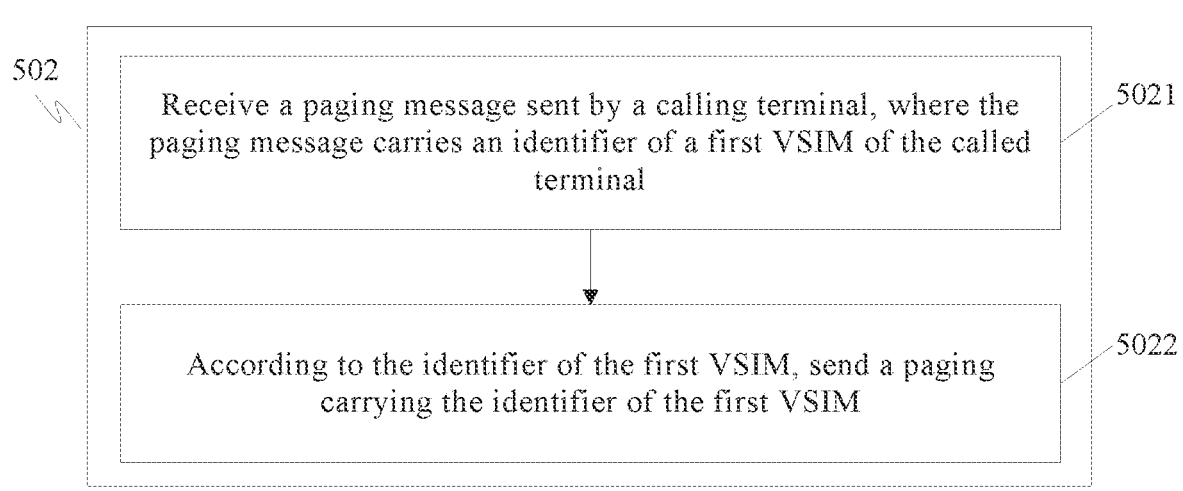
FIG. 11 is a schematic flowchart of a called paging step in Embodiment 1 of a communication method for a virtual subscriber identity module terminal provided by the present invention.

FIG. 10 and FIG. 11 show schematic flowcharts of Embodiment 1 of a communication method for a virtual subscriber identity module terminal provided by the present invention. The method described in Embodiment 1 includes:

Step 501: A calling paging step, where the calling paging step, as shown in FIG. 10, is specifically implemented as follows:

Step 5011: Receive a call request sent by the terminal, where the call request carries an identifier of a first VSIM of the terminal and a mobile subscriber number of a called terminal, the identifier of the first VSIM is obtained by the terminal by installing VSIM installation information, and the VSIM installation information is downloaded by the terminal from a VSIM management server.

Figure 12:
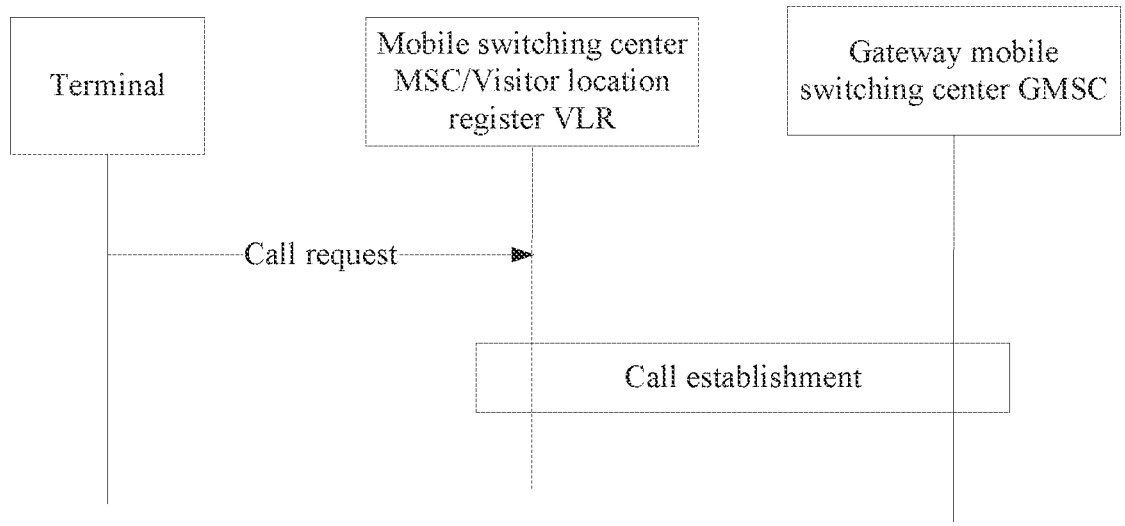
FIG. 12 is a signaling diagram of a method for establishing a call with a called terminal according to Embodiment 1 of the present invention.
Figure 13:
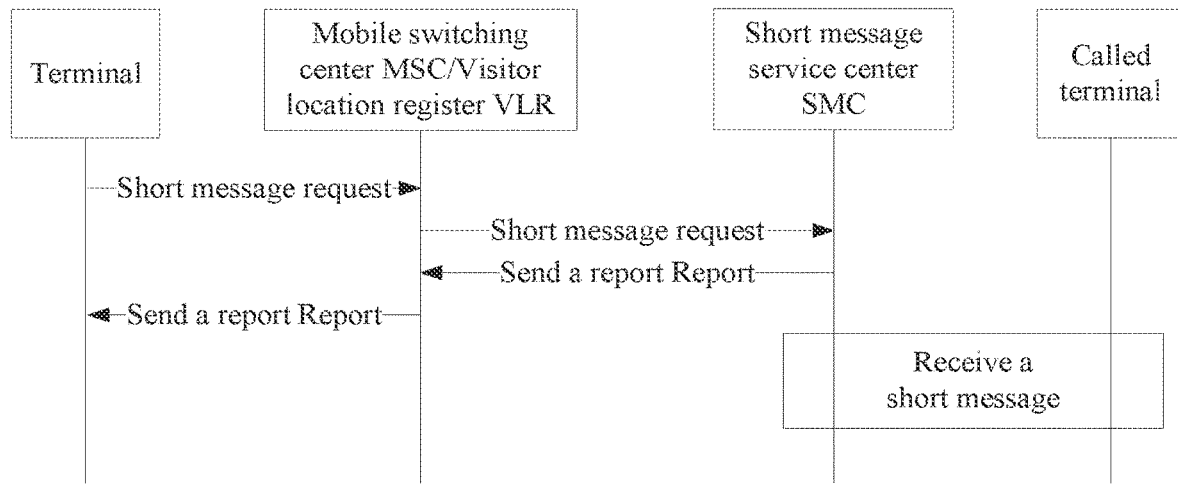
FIG. 13 is a signaling diagram of a method for performing short message transmission with a called terminal according to Embodiment 1 of the present invention.

Specifically, a mobile switching center (MSC) receives the call request sent by the terminal, where the call request can be a talking service call request or short message request. As shown in FIG. 12, the MSC receives a call request sent by the terminal in a location area where the MSC is located. As shown in FIG. 13, the MSC receives a short message request sent by the terminal in the location area where the MSC is located. The identifier of the first VSIM of the terminal can specifically be an IMSI stored in the VSIM. The VSIM management server can be newly added in a mobile operator network by an existing mobile operator, or set by a third-party operator. The third-party operator is another operator providing only the VSIM except the existing mobile operator. The VSIM management server can be an entity server, or a virtual server implemented based on an existing cloud computing technology. The virtual server implemented based on the cloud computing technology is a cloud computing platform established based on resources of all mobile operators. Based on the cloud computing platform, the third-party operator provides only installation information of the VSIM, and thus can provide a uniform service interface for all users of the terminal to download the installation information of the VSIM. Multiple pieces of VSIM installation information are stored in the VSIM management server. The terminal can download the VSIM installation information from the VSIM management server, and then install the downloaded VSIM installation information. After installation is complete, the VSIM can implement functions of an existing entity SIM; or, the terminal further needs to send activation information to the VSIM management server so as to activate the installed VSIM, and the activated VSIM can implement the functions of an existing entity SIM. The VSIM has the following functions: 1. storage of subscriber data, such as an IMSI, an authentication key (IK), a location area identity (LAI), a temporary mobile subscriber identity (TMSI), a public telephone network code whose access is prohibited, a personal identification number (PIN), a PIN unblocked key (PUK), a charging rate, a telephone directory, and the like; 2. operation and management of a personal identification number (PIN); 3. subscriber identity authentication; and 4. an encryption algorithm and a key in the SIM. After the VSIM is activated by the terminal, when the terminal is connected to the mobile operator network, a service and a service flow that can be carried out are equivalent to those carried out by an entity SIM launched by a mobile operator network operator. When the terminal is connected to a mobile operator network of an operator who has signed a roaming agreement with the mobile operator, an available service and service flow that can be carried out are equivalent to international roaming of the entity SIM launched by the mobile operator network operator, in a roaming place.

Step 5012: Control call establishment between the terminal and the called terminal according to the identifier of the first VSIM and the mobile subscriber number of the called terminal.

According to the identifier of the first VSIM and the mobile subscriber number of the called terminal, the MSC, together with a called-terminal side network element device, enters a called process, so that a talking connection is established between the terminal and the called terminal.

Step 502: A called paging step, where the called paging step, as shown in FIG. 11, is specifically implemented as follows:

Step 5021: Receive a paging message sent by a calling terminal, where the paging message carries an identifier of a first VSIM of the called terminal.

Figure 14:
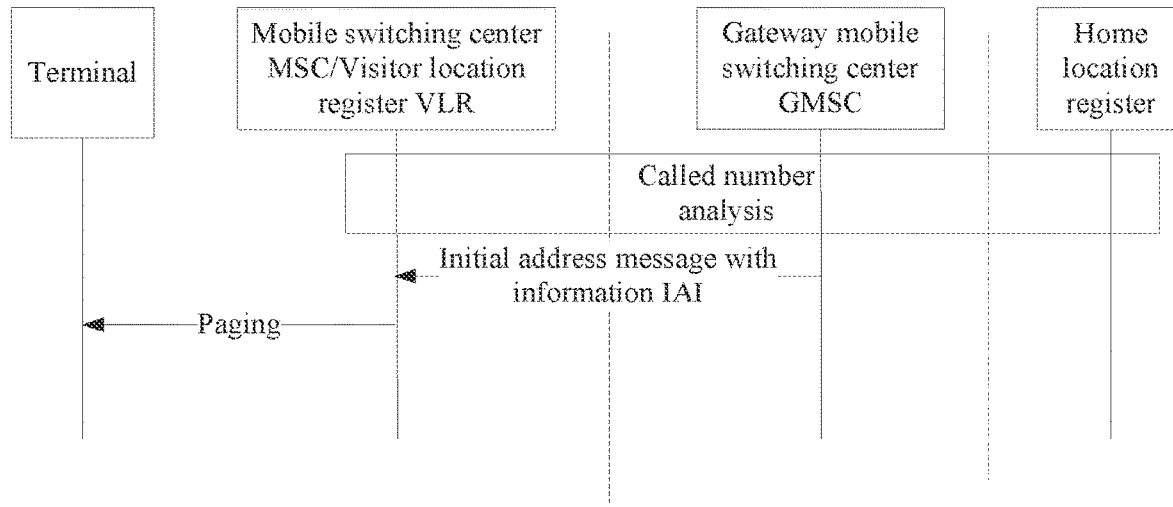
FIG. 14 is a signaling diagram of a method for establishing a call with a calling terminal according to Embodiment 1 of the present invention.
Figure 15:
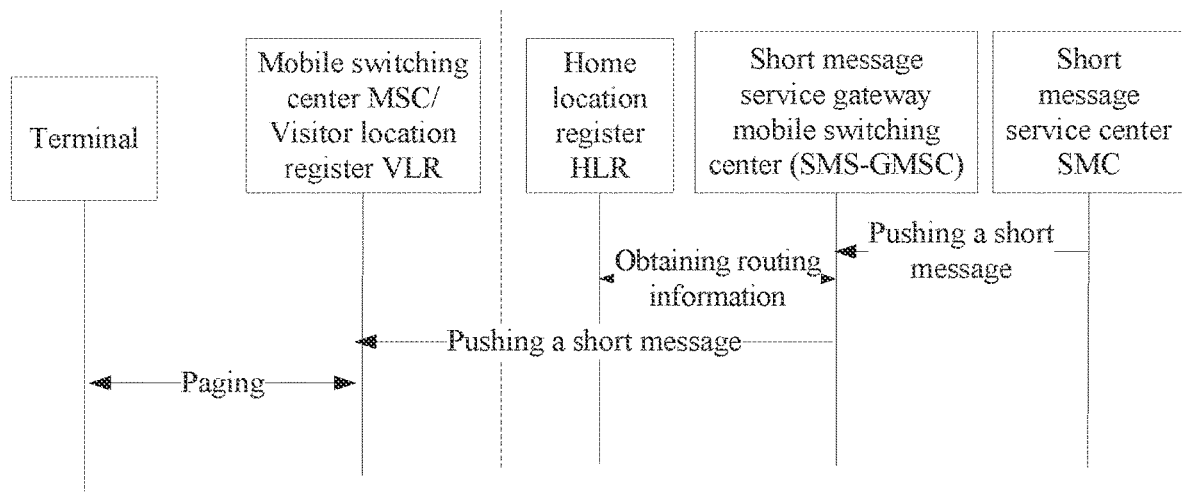
FIG. 15 is a signaling diagram of a method for performing short message transmission with a calling terminal according to Embodiment 1 of the present invention.

Specifically, the MSC receives the paging message sent by the calling terminal, where the paging message can specifically be an initial address message with additional information (IAI) sent by a gateway mobile switching center (GMSC) of the calling terminal, or a short message pushed by a short message service center of the calling terminal. As shown in FIG. 14, the MSC receives the initial address message with additional information (IAI) sent by the gateway mobile switching center GMSC on the calling terminal side. In addition to the identifier of the first VSIM of the called terminal, the initial address message with additional information (IAI) also carries address information of the first VSIM of the terminal. As shown in FIG. 15, the MSC receives a short message pushed by a short message service gateway mobile switching center SMS-GMSC on the calling terminal side.

Step 5022: According to the identifier of the first VSIM, send a paging carrying the identifier of the first VSIM.

According to the identifier of the first VSIM carried in the received paging message, the MSC broadcasts the paging carrying the identifier of the first VSIM, in a location area where the MSC is located, so that the terminal uses the first VSIM to carry out subscriber identity authentication, and establishes a radio communications link with the MSC after the authentication passes, thus the terminal is connected to the calling terminal or obtains from the MSC a short message sent by the calling terminal.

According to the method described in this embodiment, communication between the terminal and another terminal can be implemented by using the VSIM, thereby solving a problem where an existing mobile operator network does not support the VSIM, and further improving compatibility of the mobile operator network, so that the mobile operator network can support both an existing entity SIM and the VSIM at the same time. The embodiments of the present invention provide an effective and convenient operation scheme for an existing domestic or international roaming service.

Further, the step 502 in the communication method for the virtual subscriber identity module terminal described in Embodiment 1 further includes: querying whether an identifier of a second VSIM or an identifier of a SIM, associated with the identifier of the first VSIM, is stored in an HLR of the VSIM, and if so, according to the identifier of the first VSIM, sending a paging carrying the identifier of the first VSIM, and further: according to the identifier of the second VSIM or the identifier of the SIM, sending a paging carrying the identifier of the second VSIM or the identifier of the SIM.

When a mobile operator or third-party operator provides activation information of the VSIM, related information of the VSIM is also pre-stored in the home location register of the VSIM, where the related information includes subscriber data; and if the VSIM is further bound to another VSIM or SIM, the related information further includes information about a binding relationship between the VSIM and the another VSIM or SIM, as well as subscriber data of the another VSIM or SIM. Therefore, when querying whether the identifier of the second VSIM or the identifier of the SIM, associated with the identifier of the first VSIM, is stored in the HLR of the VSIM, the MSC can, according to subscription information included in the subscriber data of the VSIM, determine whether to send a paging carrying the identifier of the first VSIM according to the identifier of the first VSIM, or send a paging carrying the identifier of the second VSIM or the identifier of the SIM according to the identifier of the second VSIM or the identifier of the SIM.

Here, it should be noted that: binding of the VSIM and an entity SIM card substantially refers to that: when used in the terminal, the VSIM simulates the entity SIM in the terminal, that is, although the entity SIM card is not activated, its MSISDN can still be used as a called number, so that a virtual dual SIM dual standby function is implemented. Specifically, a VSIM management server of an operator can provide a binding service for the terminal. Especially, for a mobile phone without the dual SIM dual standby function, that is, a terminal only with one transceiver antenna, a user can send a binding service request to the VSIM management server, so that according to the service binding request, the VSIM management server binds the VSIM with an existing entity SIM card or another VSIM so as to implement the virtual dual SIM dual standby function. The virtual dual SIM dual standby function is specifically implemented as follows: an MAC queries that a paging of the entity SIM or second VSIM is not initiated, but a paging of the VSIM bound to the entity SIM or second VSIM is initiated, that is, in a condition that the entity SIM or second VSIM is not activated, an MSISDN of the entity SIM or second VSIM can still be used as a called number. The binding process can specifically be: The VSIM management server receives binding request information sent by the terminal, where the binding request information carries the identifier of the first VSIM of the terminal and the identifier of the SIM, or the identifier of the first VSIM and the identifier of a second SIM. The VSIM management server performs a binding setting according to the binding request information, where the performing the binding setting can include: according to the identifier of the first VSIM and the identifier of the SIM, obtaining, by the VSIM management server, an identifier of an HLR of the first VSIM; and afterwards, according to the identifier of the HLR, sending, by the VSIM management server, binding information carrying the identifier of the first VSIM and the identifier of the SIM to the HLR, so that according to the binding information, the HLR stores the identifier of the first VSIM and the identifier of the SIM, and associates the identifier of the first VSIM with the identifier of the SIM, thus when the MSC receives initial address message with information or a short message carrying the identifier of the SIM, if a query shows that the VSIM bound to the SIM is stored in the HLR, the MSC sends a paging carrying the identifier of the VSIM. It can be seen that: the VSIM management server separately sets storage information of the VSIM and SIM in the HLR of the bound VSIM and SIM, and establishes an association relationship between the VSIM and SIM, so that when receiving the initial address message with information or short message, the mobile switching center chooses the VSIM and SIM to be paged; therefore, the virtual dual SIM dual standby function is implemented. When the VSIM management server is provided by a third-party operator, the binding setting substantially refers to that the third-party operator sends a call transfer service request to a home operator of the existing entity SIM on the terminal, so that a service on the existing entity SIM of the terminal is transferred to the VSIM bound to the entity SIM.

Figure 16:
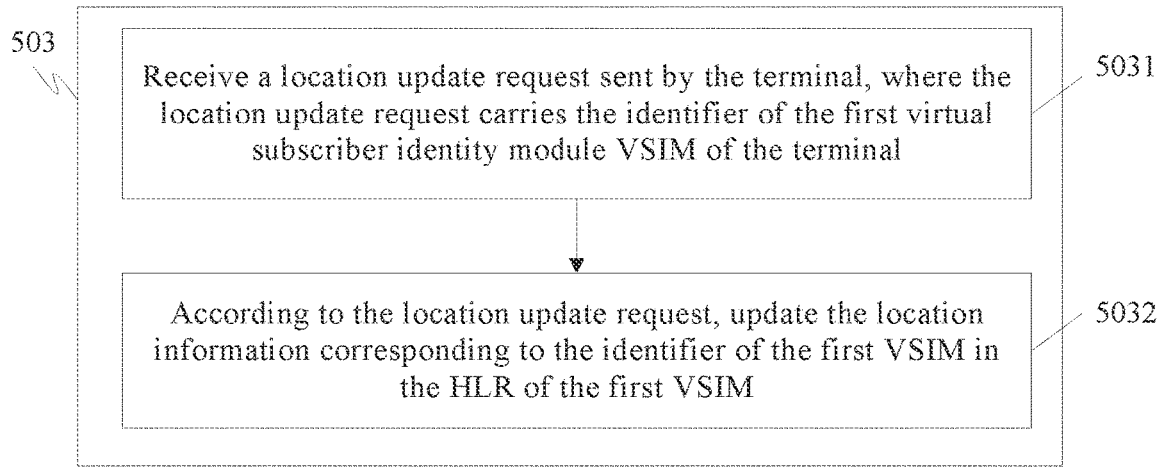
FIG. 16 is a schematic flowchart of a first embodiment of a location area update step added based on Embodiment 1 in a communication method for a virtual subscriber identity module terminal according to Embodiment 2 of the present invention.

When the terminal is moved from a location area to another location area, the terminal must be registered in the new location area, that is, the location area of the terminal needs to be updated, so that the HLR of the SIM or VSIM of the terminal updates location information of the IMSI of the SIM or VSIM in real time. Based on this, the present invention provides Embodiment 2 of the communication method for the virtual subscriber identity module terminal. As shown in FIG. 16, in addition to the step 501 and the step 502 described in Embodiment 1, the method described in Embodiment 2 further includes:

Step 503: A location area update step, where the location area update step is specifically implemented as follows.

Step 5031: Receive a location update request sent by the terminal, where the location update request carries the identifier of the first virtual subscriber identity module VSIM of the terminal.

Step 5032: According to the location update request, update the location information corresponding to the identifier of the first VSIM in the HLR of the first VSIM.

Figure 17:
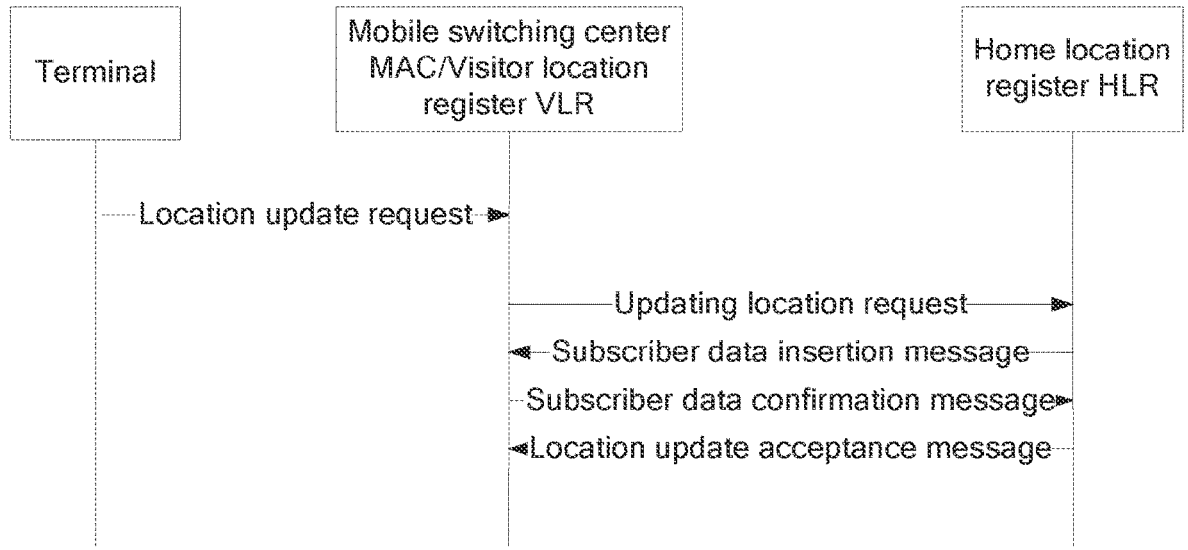
FIG. 17 is a signaling diagram of a specific example of a method for updating a location area according to Embodiment 2 of the present invention.

Specifically, as shown in FIG. 17, the MSC sends an updating location request to the HLR of the first VSIM according to the identifier of the first VSIM carried in the location update request, so that according to the updating location request, the HLR of the first VSIM returns a subscriber data insertion message carrying subscriber data of the first VSIM; and afterwards, the MAC receives the subscriber data insertion message returned by the HLR of the first VSIM, stores the subscriber data of the first VSIM in the VLR, and sends a subscriber data confirmation message carrying an identifier of the VLR to the HLR of the first VSIM, so that according to the identifier of the VLR, the HLR of the first VSIM updates the location information corresponding to the identifier of the first VSIM, and returns a location update acceptance message.

Figure 18:
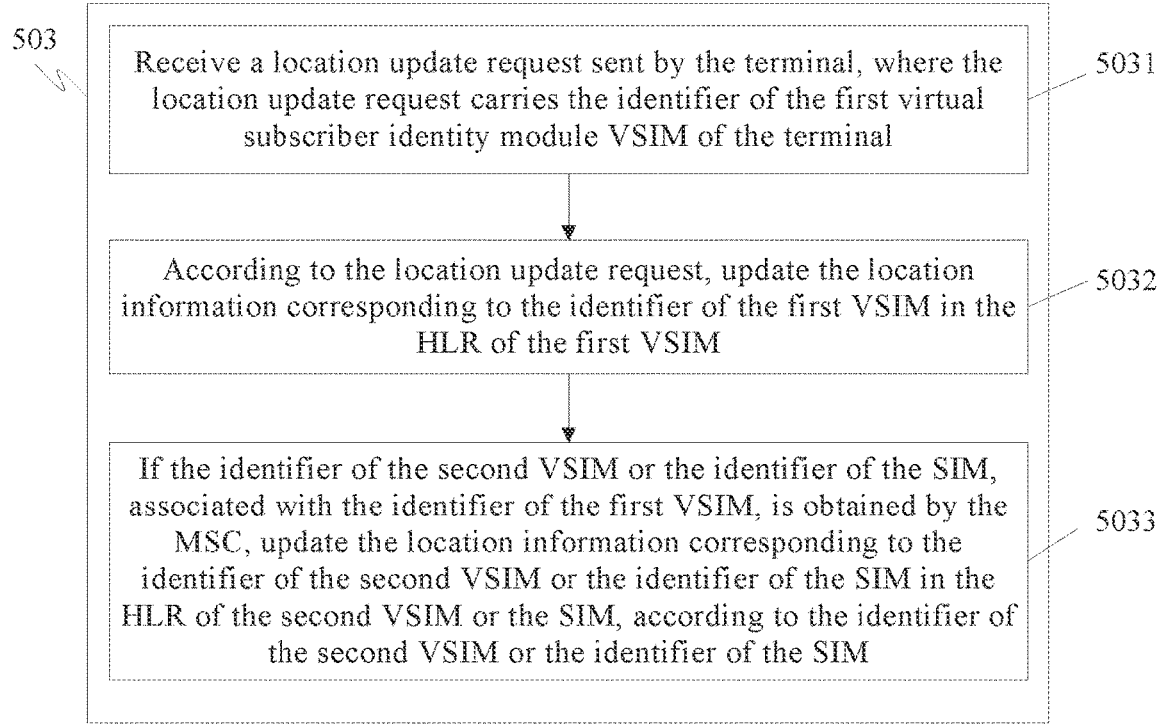
FIG. 18 is a schematic flowchart of a second embodiment of the location area step in Embodiment 2 of a communication method for a virtual subscriber identity module terminal provided by the present invention.

Further, if the first VSIM of the terminal is bound to another VSIM or an entity SIM, in order to support virtual dual SIM dual standby, the MSC needs to update the location information corresponding to the first VSIM in the VLR, as well as location information corresponding to the another VSIM or the entity SIM in the VLR. Specifically, as shown in FIG. 18, the step 503 described in Embodiment 2 further includes:

Step 5033: If the identifier of the second VSIM or the identifier of the SIM, associated with the identifier of the first VSIM, is obtained by the MSC, update the location information corresponding to the identifier of the second VSIM or the identifier of the SIM in the HLR of the second VSIM or the SIM, according to the identifier of the second VSIM or the identifier of the SIM.

Figure 19:
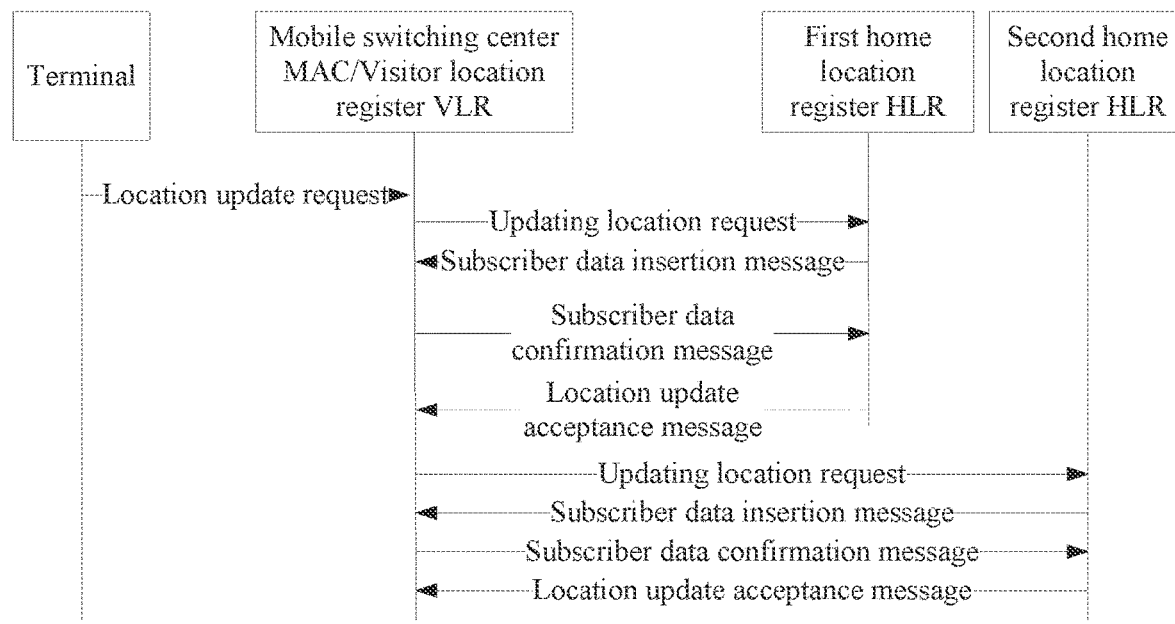
FIG. 19 is a signaling diagram of another specific example of a method for updating a location area according to Embodiment 2 of the present invention.

The identifier of the second VSIM or the identifier of the SIM, associated with the identifier of the first VSIM, can be obtained from the subscriber data insertion message returned by the HLR of the first VSIM. The HLR stores the identifier of the first VSIM and the identifier of the second VSIM or the identifier of the SIM and establishes an association relationship. When receiving the updating location request sent by the MSC, the HLR returns subscriber data insertion message carrying the subscriber data of the first VSIM and the identifier of the second VSIM or the identifier of the SIM, associated with the identifier of the first VSIM. Specifically, as shown in FIG. 19, according to the identifier of the second VSIM or the identifier of the SIM, the MSC sends the updating location request to the HLR having the identifier of the second VSIM or the identifier of the SIM, so that according to the updating location request, the HLR having the identifier of the second VSIM or the identifier of the SIM returns a second subscriber data insertion message carrying subscriber data of the identifier of the second VSIM or the identifier of the SIM; and afterwards, the MAC receives the subscriber data insertion message returned by the HLR having the identifier of the second VSIM or the identifier of the SIM, stores the subscriber data of the identifier of the second VSIM or the identifier of the SIM in the VLR, and sends a subscriber data confirmation message to the HLR, so that the HLR returns a location update acceptance message.

In this embodiment, after receiving the location update request sent by the terminal having the virtual dual SIM dual standby function, the MSC separately performs a location area update operation on the two SIMs bound to the terminal, so that the terminal having the virtual dual SIM dual standby function can simultaneously implement a standby state for the two bound SIMs.

Here, it should be noted that: for a terminal that is capable of implementing dual SIM dual standby, if there are an entity SIM and a VSIM set in the terminal, the terminal can send a location update request to an MSC by separately using an identifier of the entity SIM and an identifier of the VSIM, so that according to the received location update request, the MSC separately updates location information corresponding to the identifier of the entity SIM and the identifier of the VSIM in a visitor location register.

Figure 20:
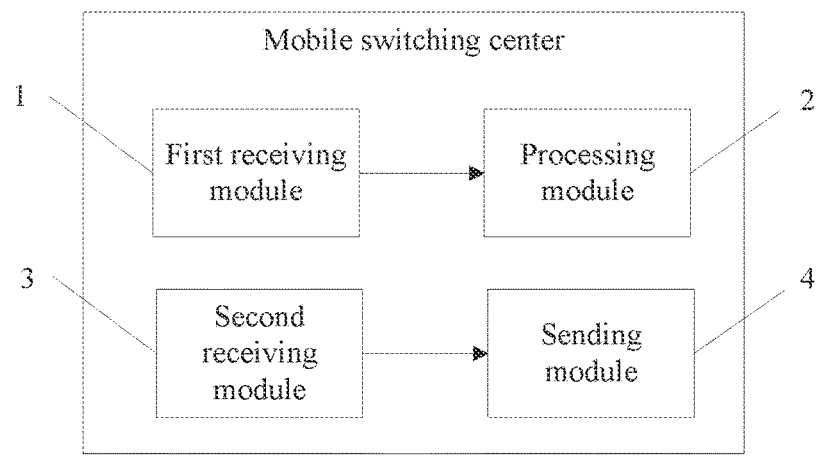
FIG. 20 is a schematic structural diagram of Embodiment 1 of a mobile switching center provided by the present invention.

FIG. 20 is a schematic structural diagram of Embodiment 1 of a mobile switching center provided by the present invention. As shown in the figure, the mobile switching center includes: a first receiving module 1, a processing module 2, a second receiving module 3 and a sending module 4, where the first receiving module 1 is configured to receive a call request that is sent by a terminal and carrying an identifier of a first VSIM of the terminal and a mobile subscriber number of a called terminal, the identifier of the first VSIM is obtained by the terminal by installing VSIM installation information, and the VSIM installation information is downloaded by the terminal from a VSIM management server; the processing module 2 is configured to: according to the identifier of the first VSIM and the mobile subscriber number of the called terminal, control call establishment between the terminal and the called terminal; the second receiving module 3 is configured to receive a paging message sent by a calling terminal, where the paging message carries the identifier of the first VSIM of the called terminal; and the sending module 4 is configured to: according to the identifier of the first VSIM, send a paging carrying the identifier of the first VSIM.

According to the method described in this embodiment, communication between the terminal and another terminal can be implemented by using the VSIM, thereby solving a problem where an existing mobile operator network does not support the VSIM, and further improving compatibility of the mobile operator network, so that the mobile operator network can support both an existing entity SIM and the VSIM at the same time. The embodiments of the present invention provide an effective and convenient operation scheme for an existing domestic or international roaming service.

Further, the mobile switching center described in Embodiment 1 further includes a querying module. Specifically, the querying module is configured to: query whether an identifier of a second VSIM or an identifier of a SIM, associated with the identifier of the first VSIM, is stored in an HLR of the first VSIM, and if so, generate a query instruction. Correspondingly, the sending module described in Embodiment 1 is further configured to: according to the identifier of the second VSIM or the identifier of the SIM carried in the query instruction, send a paging carrying the identifier of the second VSIM or the identifier of the SIM.

Figure 21:
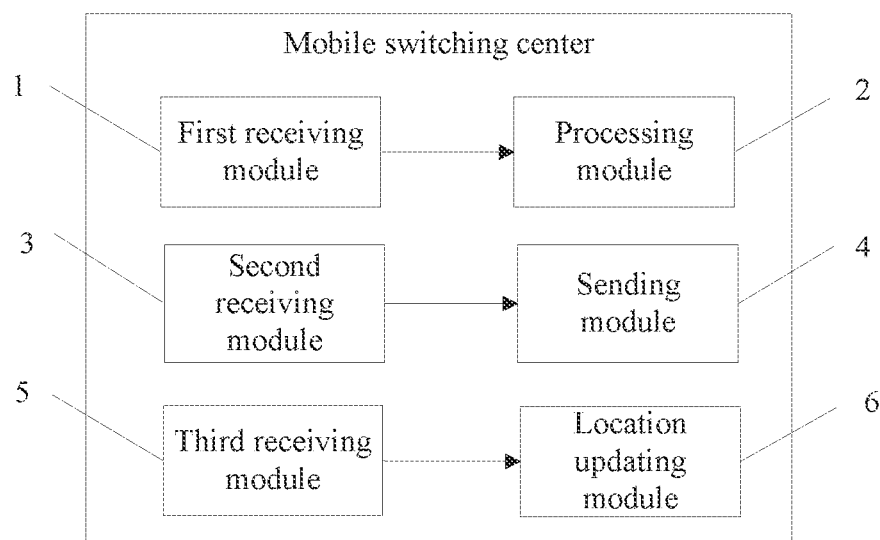
FIG. 21 is a schematic structural diagram of Embodiment 2 of a mobile switching center provided by the present invention.

FIG. 21 is a schematic structural diagram of Embodiment 2 of a mobile switching center provided by the present invention. As shown in the figure, in addition to the modules described in Embodiment 1, the mobile switching center described in this embodiment further includes: a third receiving module 5 and a location updating module 6, where the third receiving module 5 is configured to receive a location update request that is sent by the terminal and carrying the identifier of the first VSIM of the terminal, and the identifier of the first VSIM is obtained by the terminal by installing VSIM installation information, and the VSIM installation information is downloaded by the terminal from a VSIM management server; and the location updating module 6 is configured to: according to the location update request, update location information corresponding to the identifier of the first VSIM in the HLR of the first VSIM.

Figure 22:
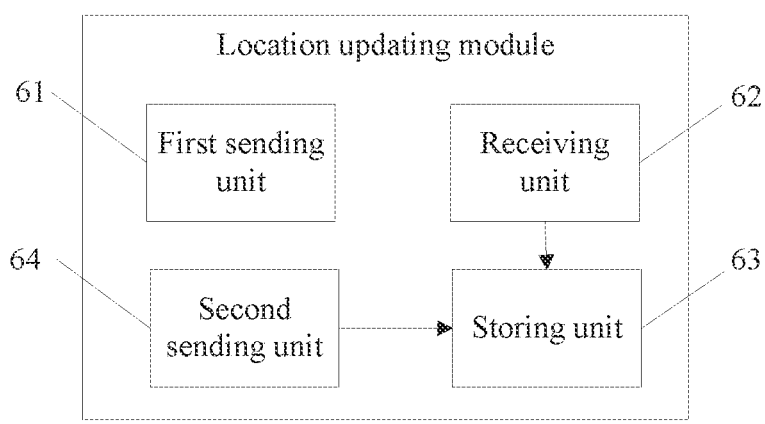
FIG. 22 is a schematic structural diagram of a specific implementation example of a location updating module described in an embodiment of a mobile switching center provided by the present invention.

Specifically, the location updating module described in Embodiment 2 can be implemented by using a structure shown in FIG. 22. As shown in FIG. 22, the location updating module 6 includes: a first sending unit 61, a receiving unit 62, a storing unit 63 and a second sending unit 64, where the first sending unit 61 is configured to: according to the identifier of the first VSIM carried in the location update request, send a updating location request to the HLR of the first VSIM, so that according to the updating location request, the HLR of the first VSIM returns a subscriber data insertion message carrying subscriber data of the first VSIM; the receiving unit 62 is configured to receive the subscriber data insertion message returned by the HLR of the first VSIM; the storing unit 63 is configured to store in a VLR the subscriber data of the first VSIM carried in the subscriber data insertion message received by the receiving unit, and generate a storage completion instruction; and the second sending unit 64 is configured to: after receiving the storage completion instruction, send a subscriber data confirmation message carrying an identifier of the VLR to the HLR of the first VSIM, so that according to the identifier of the VLR, the HLR of the first VSIM updates the location information corresponding to the identifier of the first VSIM, and returns a location update acceptance message.

Here, it should be noted that: when the terminal has a binding service, if the VSIM is bound to an original entity SIM, the VSIM and the entity SIM are stored in the HLR of the VSIM of the terminal, and an association is established between the VSIM and entity SIM. When a first subscriber data insertion message received by the receiving unit in the location updating module from the HLR further carries an identifier of the entity SIM, associated with the identifier of the VSIM, the location updating module is further configured to: according to the identifier of the entity SIM, update location information corresponding to the identifier of the entity SIM in an HLR of the second VSIM or the SIM. Certainly, the VSIM can also be bound to another VSIM having a different identifier, not limited to the entity SIM.

Specifically, the first sending unit in the location updating module is further configured to: when the subscriber data insertion message received by the receiving unit carries the identifier of the second VSIM or the identifier of the subscriber identity module SIM, associated with the identifier of the first VSIM, send an updating location request to an HLR having the identifier of the second VSIM or the identifier of the SIM, so that according to the updating location request, the HLR of the second VSIM or the SIM returns a subscriber data insertion message carrying subscriber data of the identifier of the second VSIM or the identifier of the SIM. The receiving unit is further configured to receive the subscriber data insertion message returned by the HLR of the second VSIM or the SIM. The storing unit is further configured to store in the VLR the subscriber data of the identifier of the second VSIM or the identifier of the SIM, and generate a storage completion instruction. The second sending unit is further configured to: after receiving the storage completion instruction, send a subscriber data confirmation message carrying an identifier of the VLR to the HLR of the second VSIM or the SIM, so that according to the identifier of the VLR, the HLR of the second VSIM or the SIM updates location information corresponding to the second VSIM or the SIM, and returns a location update acceptance message.

The present invention provides an embodiment of a mobile operator network. The mobile operator network described in this embodiment includes a mobile switching center, a VLR and an HLR. The mobile switching center is configured to: receive a call request sent by a terminal, where the call request carries an identifier of a first VSIM of the terminal and a mobile subscriber number of a called terminal, and the identifier of the first VSIM is obtained by the terminal by installing VSIM installation information, and the VSIM installation information is obtained by the terminal from a VSIM management server, and control call establishment between the terminal and the called terminal according to the identifier of the first VSIM and the mobile subscriber number of the called terminal, and receive a paging message sent by a calling terminal, where the paging message carries an identifier of a first VSIM of the called terminal, and according to the identifier of the first VSIM, send a paging carrying the identifier of the first VSIM. The visitor location register VLR is configured to store subscriber data backup of all mobile subscribers of each cell covered by the mobile switching center, where the subscriber data backup is kept in the home location register HLR. The HLR is configured to store subscriber data and location information of a mobile subscriber served by the HLR. Specifically, the mobile switching center can be a mobile switching center described in the foregoing embodiments; an operating principle of the mobile switching center is shown in the foregoing embodiments and is not described here any further.

The technical solutions provided by the embodiments of the present invention can be applied to various communication systems, such as a Global System for Mobile Communications (GSM), a general packet radio service (GPRS) system, a Code Division Multiple Access (CDMA) system, a CDMA2000 system, a Wideband Code Division Multiple Access (WCDMA) system, a Long Term Evolution (LTE) system or a World Interoperability for Microwave Access (WiMAX) system, and the like.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for a terminal comprising a virtual subscriber identity module (VSIM), the method comprising:
   sending, by the terminal to a VSIM management server, a VSIM application request, wherein the VSIM application request carries an identifier of a VSIM desired by a user;
   receiving, by the terminal from the VSIM management server, VSIM installation information associated with the identifier of the VSIM desired by the user;
   installing, by the terminal, the VSIM installation information; and
   sending, by the terminal, binding request information comprising the identifier of the VSIM of the terminal, wherein the binding request information is used to bind the identifier of the VSIM of the terminal and an identifier of a SIM of the terminal.

2. The method according to claim 1, further comprising:
   sending, by the terminal, activation information to the VSIM management server; and
   receiving, by the terminal, information which is in response to the activation information.

3. The method according to claim 1, wherein the VSIM installation information is generated according to parameter information of the VSIM, and
   wherein the parameter information comprises an international mobile subscriber identity (IMSI), or a phone number, or subscriber identity authentication security algorithm information.

4. The method according to claim 3, wherein the VSIM installation information is generated according to source identification information of parameter information of the VSIM.

5. The method according to claim 2, wherein the activation information comprises an activation code which is provided by the VSIM management server or is obtained in response to the VSIM installation information being installed.

6. The method according to claim 2, wherein the activation information comprises the identifier of the VSIM.

7. The method according to claim 6, wherein the identifier of the VSIM comprises an international mobile subscriber identity of the VSIM.

8. A non-transitory computer readable storage medium storing a program, which when executed by a processor of a terminal, cause the terminal to implement a method comprising:
   sending a virtual subscriber identity module (VSIM) application request to a VSIM management server, wherein the VSIM application request carries an identifier of a VSIM desired by a user;
   receiving, from the VSIM management server, VSIM installation information associated with the identifier of the VSIM desired by the user;
   installing the VSIM installation information; and
   sending binding request information comprising the identifier of the VSIM of the terminal, wherein the binding request information is used to bind the identifier of the VSIM of the terminal and an identifier of a SIM of the terminal.

9. The non-transitory computer readable storage medium according to claim 8, wherein the method further comprising:
   sending activation information to the VSIM management server; and
   receiving information which is in response to the activation information.

10. The non-transitory computer readable storage medium according to claim 8, wherein the VSIM installation information is generated according to parameter information of the VSIM, wherein the parameter information comprises an international mobile subscriber identity (IMSI), or a phone number, or subscriber identity authentication security algorithm information.

11. The non-transitory computer readable storage medium according to claim 10, wherein the VSIM installation information is generated according to source identification information of parameter information of the VSIM installation information.

12. The non-transitory computer readable storage medium according to claim 9, wherein the activation information comprises an activation code which is provided by the VSIM management server or is obtained when the VSIM installation information is installed.

13. The non-transitory computer readable storage medium according to claim 9, wherein the activation information comprises the identifier of the VSIM.

14. The non-transitory computer readable storage medium according to claim 13, wherein the identifier of the VSIM comprises an international mobile subscriber identity of the VSIM.

15. The method according to claim 1, wherein before sending the VSIM application request, the method further comprises:
   sending, by the terminal, a location update request to a mobile switching center, wherein the location update request comprises an identifier of a SIM of the terminal; and
   receiving, by the terminal, a VSIM application alert from the VSIM management server.

16. The method according to claim 1, wherein before sending the VSIM application request, the method further comprises:
   sending, by the terminal, a location update request to a mobile switching center, wherein the location update request comprises an identifier of a SIM of the terminal; and
   receiving, by the terminal, VSIM application address information of the VSIM management server.

17. The non-transitory computer readable storage medium according to claim 10, wherein the program is configured to enable the terminal to implement:
   sending a location update request to a mobile switching center, wherein the location update request comprises an identifier of a SIM of the terminal; and
   receiving a VSIM application alert from the VSIM management server.

18. The non-transitory computer readable storage medium according to claim 10, wherein the program is configured to enable the terminal to implement:

sending a location update request to a mobile switching center, wherein the location update request comprises an identifier of a SIM of the terminal; and
receiving VSIM application address information of the VSIM management server.

* * * * *